…

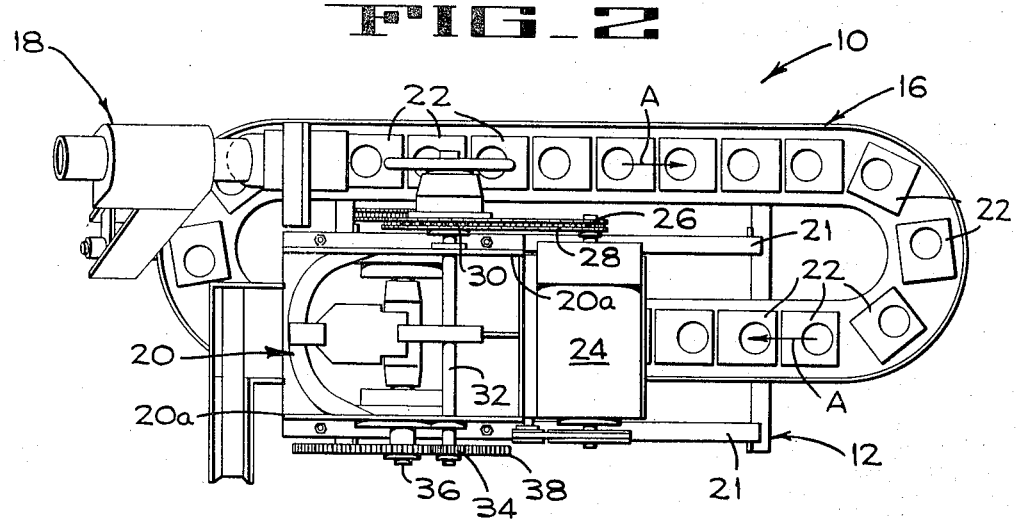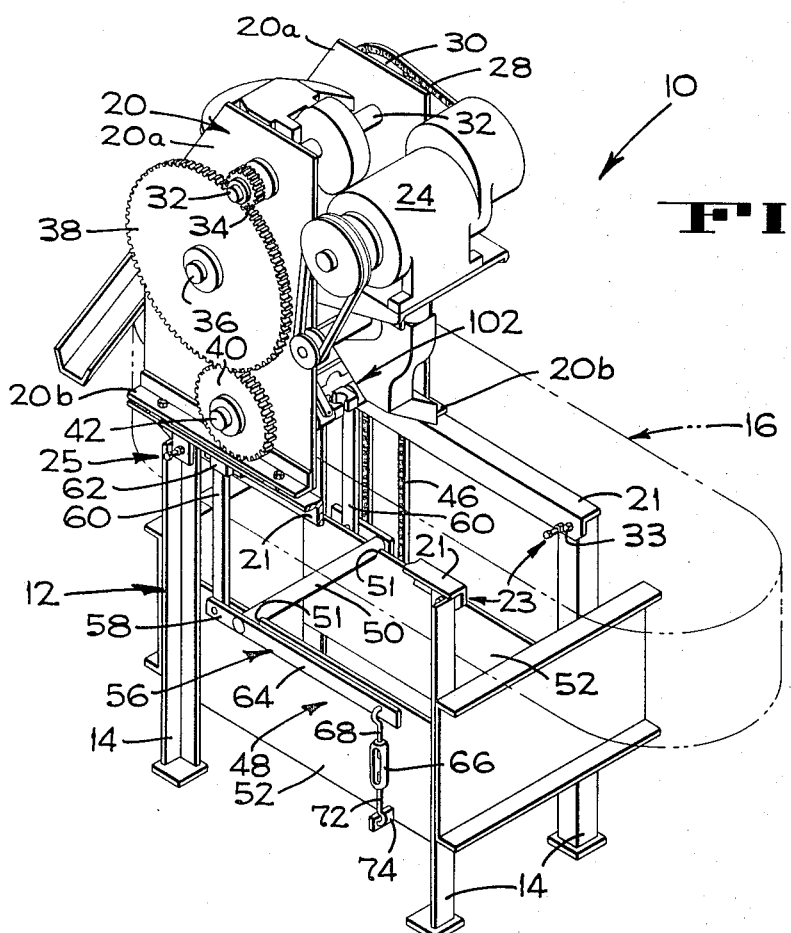

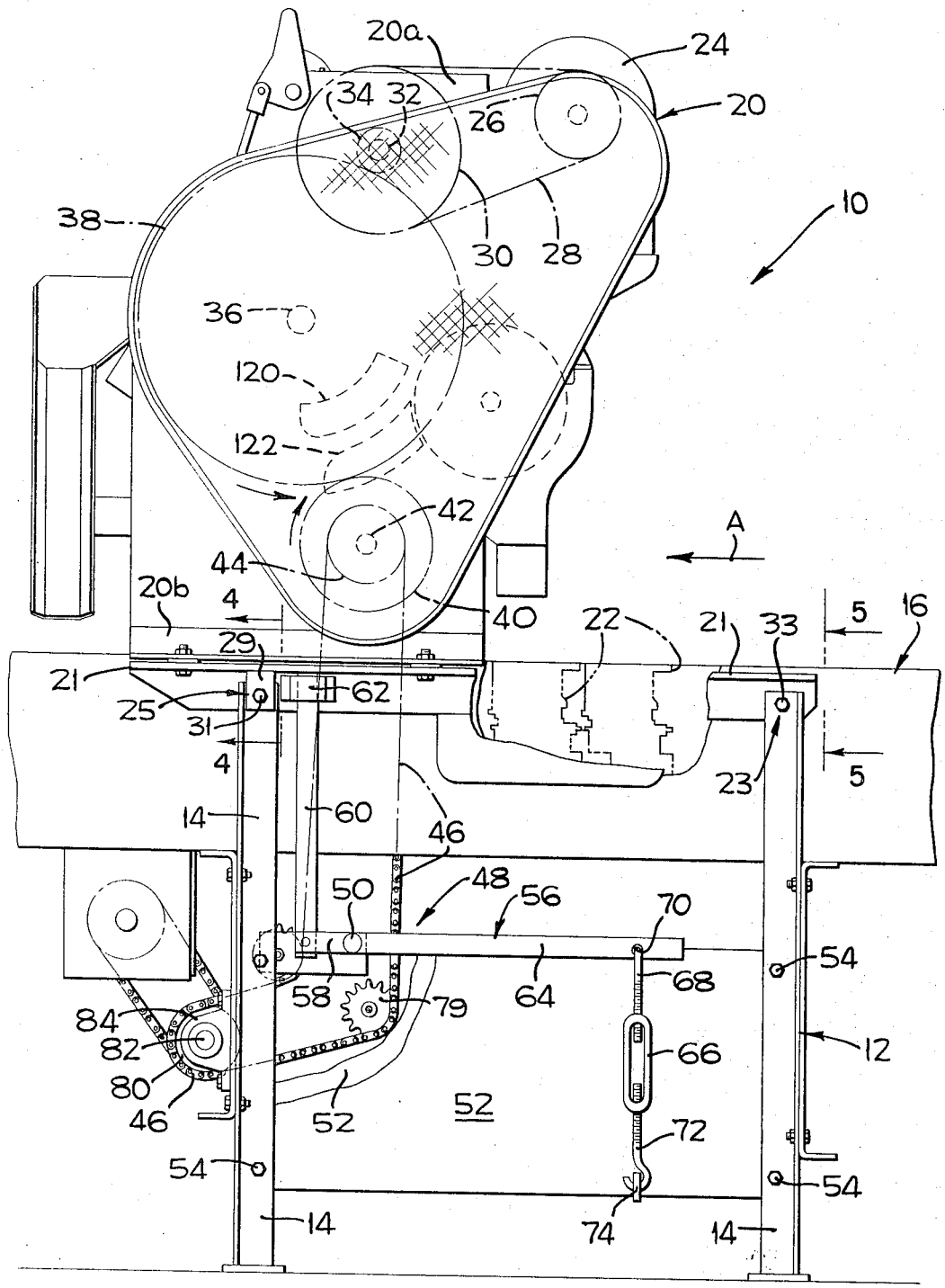

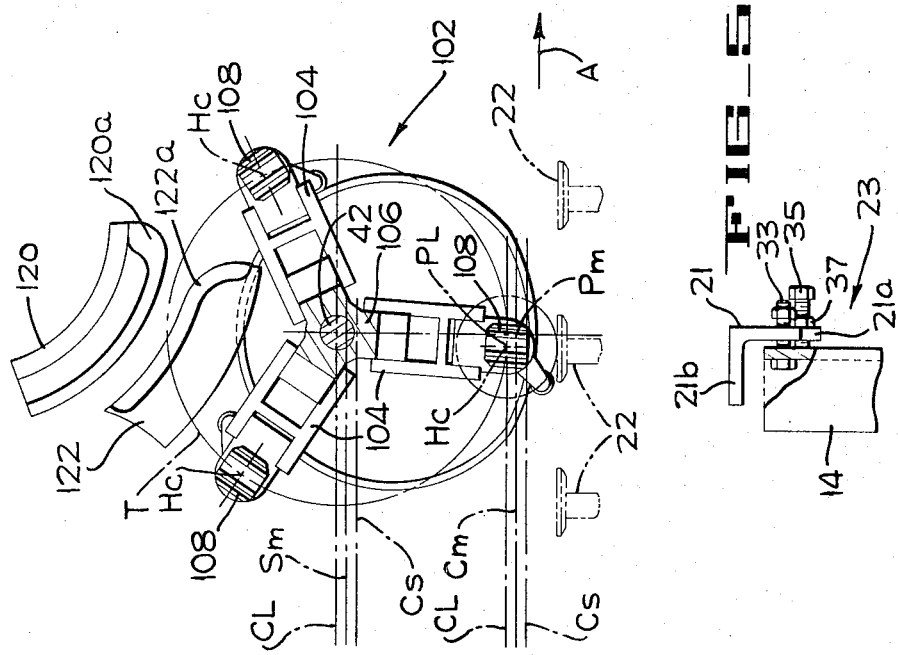
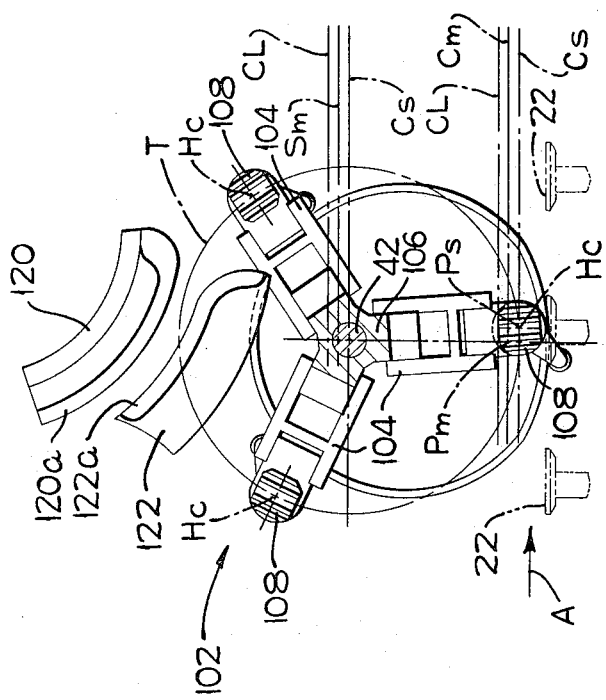

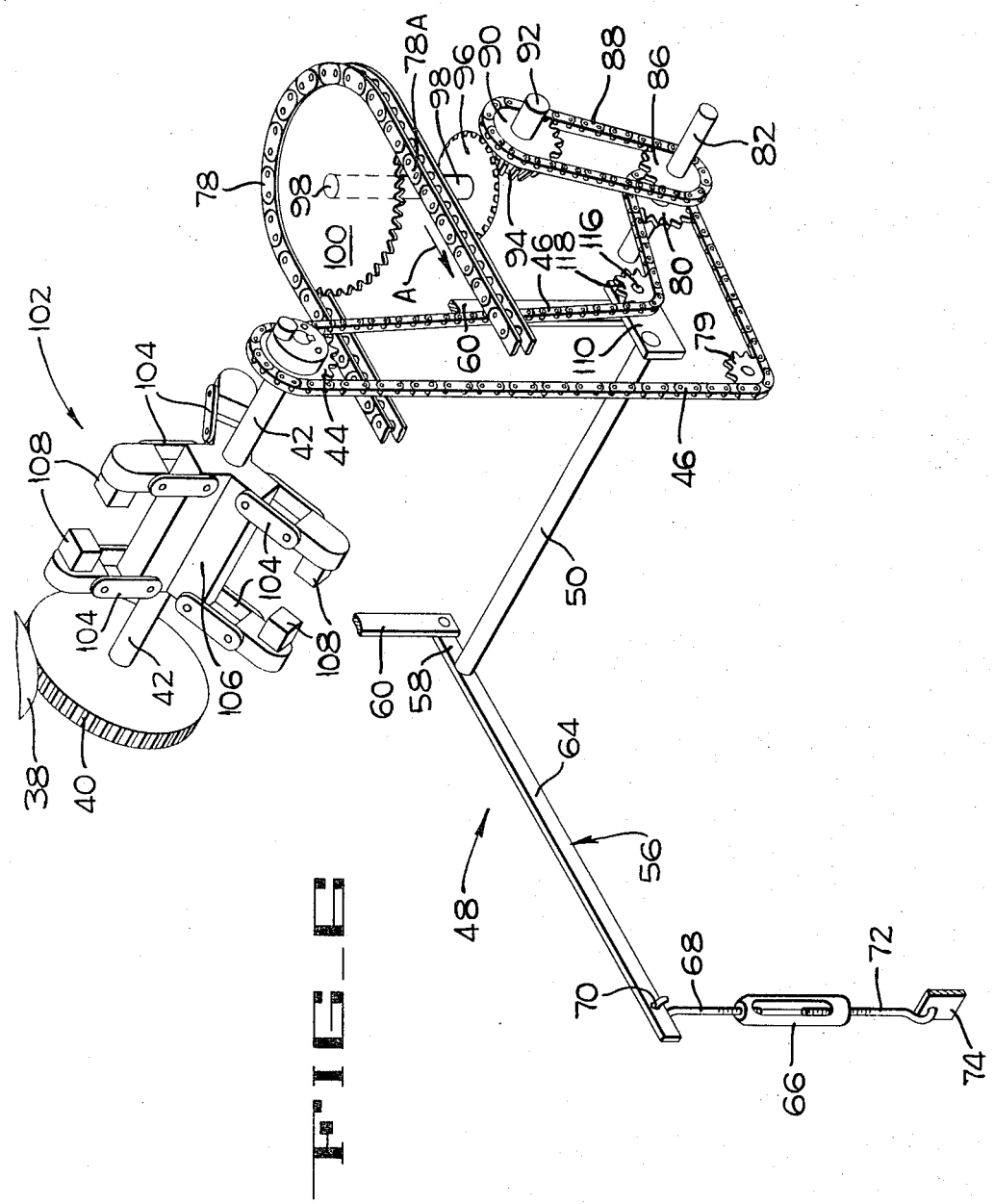

United States Patent Office 3,305,066
Patented Feb. 21, 1967

3,305,066
ADJUSTING DEVICE FOR A
TRANSFER MECHANISM
David Elford, The Patch, Victoria, and Lindsay G. Hill, Melbourne, Victoria, Australia, assignors to FMC Corporation, San Jose, Calif., a corporation of Delaware
Filed Dec. 2, 1965, Ser. No. 511,078
10 Claims. (Cl. 198—25)

This invention relates to an adjusting device and more particularly to a device which is adapted to transfer articles of various sizes in a desired orientation and at a fixed location between processing mechanisms.

Although the principles of this invention will be explained in connection with a food processing machine of the type which handles drupaceous fruit, the basic concept is applicable to a variety of situations where it is necessary to transfer oriented articles, that may vary in size, between successive processing stations.

For related and more detailed disclosures of various constructional details of the fruit processing apparatus disclosed herein, reference should be made to U.S. application Serial No. 426,745 to David Elford entitled Fruit Handling Apparatus, filed January 21, 1965 and application Serial No. 426,876 to Lindsay G. Hill entitled Fruit Processing Apparatus, also filed January 21, 1965. Both applications are assigned to the assignee of the present invention.

In the preparation and processing of drupaceous fruit for packaging it is common practice to preliminarily classify the fruit in accordance with their size. Typically the fruit is classified as small, medium or mean, and large. If it is desired, for example, to process small fruit, various mechanisms of the apparatus are adjusted in order to insure accurate location of each fruit as it passes through the processing mechanism. Since the processing of drupaceous fruit for canning involves bisecting of the fruit into halves along its suture, care must be exercised in properly orienting the imaginary plane of the suture to coincide with a bisecting device. In addition to such orientation it is also essential to present the fruit to the bisecting device at a selected point so that the pit does not interfere with the operation of the bisecting device.

The basic mechanism of this invention and those of the above referenced applications comprises a plurality of fruit conveying and orienting carriages which travel in a closed horizontal path. At one point of such path a feeding mechanism is provided which feeds randomly oriented fruit to the carriages. As the carriages travel from the feed station, the fruit is mechanically manipulated until its suture plane is oriented in the direction of travel. The properly oriented fruit then passes to a rotatable transfer turret which is operated in synchronism with the speed of the carriages and is effective to grasp each fruit on opposite sides of the suture plane and translate it in an arc to a pair of fixed, laterally spaced slitting blades. These blades produce diametrically opposed cuts along the suture of the fruit substantially bisecting the fruit to the margin of the pit before it is transferred by other mechanisms such as a saw which cuts the pit, thus completing the bisecting operation.

While it is one of the features of the above referenced Elford application to condition the food processing machine for handling fruit of various sizes, it was found that proper registration of the fruit on the splitting blades was not dependably performed due to the fact that the transfer turret did not grasp fruit of various sizes at the same point of its orbit. In the Elford application the fruit orienting and transporting carriages are raised when small fruit is being processed and lowered as the size of the fruit increases to thereby locate the theoretical center of the fruit in a predetermined plane with respect to the orbit of the transfer turret.

In contrast to this adjustment the present invention provides an apparatus that not only maintains the theoretical center of the various sizes of fruit in a definite relationship with the orbit of the transfer turret but also retards or advances the carriages permitting the transfer turret to engage the fruit, irrespective of their size, substantially at their theoretical center so that they are translated to the splitting blades at the desired point.

Accordingly, it is an object of this invention to adjust the time relationship between synchronously related stations of an article handling device.

Another object is to insure grasping of a fruit at desired portions of its surface by a transfer mechanism so that it may be transferred in a selected orientation.

Another object is to simultaneously displace the orbit of a rotary transfer device relative to the centers of fruit to be transferred by such device and to retard or advance the point at which the fruit is grasped by the transfer device with such retardation or advancement being dictated by the size of the fruit to be processed.

Other and further objects and advantages of the present invention will be apparent from the following description taken in connection with the accompanying drawings in which:

FIGURE 1 is a diagrammatic perspective of a fruit processing machine constructed according to the invention.

FIGURE 2 is a diagrammatic plan of the processing machine.

FIGURE 3 is an enlarged fragmentary side elevation of the fruit processing machine shown in FIGURE 1;

FIGURES 4 and 5 are enlarged fragmentary sections taken along lines 4—4 and 5—5, respectively, of FIG. 3, illustrating devices for adjusting the pitter mechanism transversely relative to the carriage frame;

FIGURE 6 is a diagrammatic perspective showing the transfer turret and the means for simultaneously adjusting the height of the transfer turret and the timing of the fruit orienting carriages;

FIGURE 7 is a diagrammatic operational view illustrating the point at which the pick-up arms of the transfer turret engage a small fruit and;

FIGURE 8 is an operational diagrammatic view showing the point at which the transfer arms engage a large fruit.

Referring now to FIGURES 1 and 2 of the accompanying drawings there is shown a fruit processing machine 10 incorporating the novel adjusting device of this invention and it comprises a support frame 12 having rectangularly spaced upwardly extending legs 14 for supporting a carriage conveyor frame 16 which is arranged to orient and transport fruit in the direction of arrows A from a feed mechanism 18 to a pitter mechanism 20. For a more detailed disclosure of the carriage conveyor frame 16, the feed mechanism 18, and the pitter mechanism 20 reference should be made to the Elford application. The carriage conveyor frame 16 comprises a plurality of adjacent fruit supporting and orienting carriages 22 which travel in a closed generally elliptical path indicated by the arrows in FIGURE 2. At one point in their travel the carriages pass under the feed mechanism 18 which is operated in timed relation with the movement of the carriages to discharge a randomly oriented item of fruit to each carriage as it passes the feed mechanism. The carriages 22 transport each fruit past the pitter mechanism 20 and, in moving from the feed mechanism 18 to the pitter mechanism 20, orienting means are operative to position the fruit so that its suture plane is located in the direction of movement. At a predetermined point a transfer turret, which will hereinafter be described in some detail, removes the fruit from each carriage and transfers it to the pitter mechanism which operates to bisect the fruit and remove the pit halves from the fruit.

The carriages are transported in a horizontal plane by a suitable sprocket chain. When fruit of a certain size is being processed by the machine, the fruit centers are located in a common horizontal plane. However, as the size of the fruit varies, for example when the fruit is larger, the plane containing the pit centers will be higher. Accordingly, the position of such centers with respect to the pitter mechanism 20 will vary in accordance with the diameter of the fruit. As will be presently described, such a variation of the fruit centers relative the pitter mechanism 20 is the basic problem to which this invention is addressed.

In order to locate the pitter mechanism 20 in transverse alignment with center of the carriages, adjusting means 23 and 25 are provided. There is also provided laterally aligned pivots for raising and lowering the pitter mechanism 20 relative to the carriage frame 16. As shown in FIGURE 1 the pitter mechanism 20 includes side plate members 20a having angle irons 20b secured to their lower portions. These angles are attached to elongate laterally spaced structural members 21. The ends of the structural members are pivotally connected to a laterally spaced pair of the upwardly extending legs 14, as indicated at 23, and the other ends of the members 21 are releasably attached to the remaining laterally spaced legs 14 at 25. The specific manner in which the pitter head mechanism 20 is connected to the carriage frame 16 is shown in FIGURES 4 and 5.

Referring first to FIGURE 4 which shows the releasable connection 25, it will be seen that a conventional bolt 27 is threaded through one web 21a of the structural member 21 and the end of this bolt can be positioned to engage the web 14a of the angle iron leg 14. A downwardly depending, generally rectangular plate 29 is secured to the web 21b, preferably by welding. Another bolt 31, being axially aligned with the bolt 27, is threaded through a tapped hole formed in the plate 29 and is arranged to engage the opposite surface of the web 14a. Although not shown, it is to be understood that the opposite side of the pitter head mechanism 20 is provided with the identical structure. By providing the above described arrangement the structural members 21 may be moved laterally with respect to the carriage frame 16 by merely manipulating the bolts 27 and 31. For example, assuming it is desired to move the member 21 to the left, as viewed in FIGURE 4, all that is required is to rotate the bolt 27 so that is is displaced to the right and then the bolt 31 is rotated, also moving it to the right until the end of the bolt 31 comes in contact with the web 14a. As a result the member 21 is moved to the left relative to the fixed leg 14. This, of course, causes the pitter head mechanism 20 to be adjusted laterally with respect to the carriage conveyor frame 16 which is fixed relative to the legs 14.

Referring to FIGURE 5, there is shown the adjusting means 23 which also includes a pivot connection allowing the pitter head 20 to be raised and lowered with respect to the carriage conveyor frame 16. As shown in FIGURE 5, a bolt 33 extending through the web 21a of the member 21 and through the leg 14 pivotally interconnects the member 21 to the leg 14. Another bolt 35 including a jam nut 37 is disposed in a tapped hole formed in the web 21a and the end of the bolt 35 engages the surface of the leg 14. During lateral adjustment of the pitter head mechanism 20 with respect to the carriage conveyor frame 16, this bolt is also manipulated in order to locate the pitter head mechanism 20 in alignment with the carriages 22.

As shown in FIGURES 1 to 3, the pitter mechanism 20 comprises a motor 24 having a sprocket 26 mounted on its output shaft about which is trained a sprocket chain 28 that is also trained about another sprocket 30 which is fixed to a transverse shaft 32 having a gear 34 secured to its other end. On a shaft 36, and rotatably mounted on the frame of the pitter head, there is a large gear 38 in mesh with the gear 34 and with a gear 40 which is secured to another shaft 42 also carried by the frame of the pitter head mechanism 20. The gear 40 is secured to one end of the shaft 42 and at the other end there is secured a sprocket 44 which has trained thereabout a sprocket chain 46.

The novel adjusting device of this invention in generally indicated by the numeral 48 and it is arranged to perform two functions simultaneously in order to insure proper transfer of the fruit from the carriages 22 to the pitter head mechanism 20. Broadly speaking, the adjusting device comprises means for pivoting the pitter mechanism 20 about the pivot 33 with respect to the support frame 12 and means, concurrently operable with the raising or lowering of the pitter mechanism 20, for advancing or retarding the carriages 22.

The adjusting device 48 comprises a transverse shaft 50 which is seated in arcuate sockets 51 (FIG. 1) formed in side plate members 52 which are secured to the legs 14 in any suitable manner but preferably by means of bolts 54. Rigidly mounted on one end of this shaft is an elongate lever arm 56 having a short arm portion 58 on the end of which is a pivotally connected upwardly extending push rod 60 which is slidably fitted through a U-shaped guide bracket 62 secured to member 21. The end of the push rod is in contact with the underside of the outwardly extending web of member 21. The lever 56 has a long arm portion 64 connected to a variable length link mechanism, preferably a turn buckle 66, which has one of its threaded rods 68 formed in the shape of a hook located in a hole 70 in the arm portion 64. The remaining threaded rod 72 is also hooked-shaped and is attached to an anchor 74 which may be attached to the frame structure 12 in any suitable manner. According to the above described construction, it should be readily apparent that manipulation of the turnbuckle 66 will cause rocking movement of the lever 56, with the shaft 50 acting as a fulcrum, which will, in turn, move the push rod 60 upwardly or downwardly depending upon the shortening or lengthening of the turnbuckle.

The output of the motor 24 is utilized to drive a sprocket chain 78 (FIG. 6) to which is attached the carriages 22. When the carriages are in the run 78A of chain 78 they move in the direction of arrow A and pass under the pitter. The sprocket chain 46, which is trained about the sprocket 44, is also trained about an idler sprocket 79, and a sprocket 80 which is keyed to a counter shaft 82 rotatably mounted in suitable bearings 84 (FIG. 3) carried by the frame structure 12. Another sprocket 86 is keyed to the shaft 82 and it has a sprocket chain 88 trained thereabout which is also trained about another sprocket 90 fixed to a shaft 92. On the shaft 92 there is also secured a bevel gear 94 meshingly engaged with another bevel gear 96 carried by a shaft 98 mounting a sprocket 100 which drives the carriage chain 78.

Accordingly, when the motor 24 is operated to rotate the gear 40, the gear 34, and the gear 38, rotation is imparted to the shaft 42 causing circulation of the sprocket chain 46 through the sprocket 44 which keyed to the shaft 42. Circulation of the sprocket chain 46 causes rotation of the shaft 82 and the shaft 92 through the chain 88. Rotation of the shaft 92 is transmitted to the sprocket 100 by the bevel gears 94 and 96. By virtue of the described sprocket chain and gear drive there is established a definite time relationship between the operation of the pitter head mechanism 20 and the carriages 22.

The transfer turret associated with the pitter head 20 of this invention is generally indicated by the numeral 102 (FIG. 6) and is shown diagrammatically since its actual construction does not form part of this invention. For details of the transfer turret reference should be made to the Elford application. Suffice to say for the purposes of the present invention that the transfer turret includes circumferentially spaced radially extending pairs of arms 104 (FIG. 6) each of which is connected to a hub 106 which is keyed to the shaft 42. Appropriate mechanisms such as springs and cams are provided for moving the pairs of arms toward and away from each other as the shaft 42 rotates. Each of the arms is provided with a fruit gripping head 108 being made of suitable resilient material. At one point of the orbit described by these arms they are pivoted toward each other for engaging a fruit located therebetween by the carriages 22, whereupon the fruit is removed from the carriages and transported in such orbit to bisecting mechanisms which are part of the pitter mechanism 20.

It is essential for proper operation of the fruit bisecting mechanisms that each fruit is fed thereto at a predetermined location and in a desired orientation. In order to fulfill this requirement the imaginary center of the fruit gripping heads 108 should coincide with a line which is normal to the suture plane and contains the center of the fruit. The arms 104 move inwardly toward each other and are located a minimum distance apart at a fixed point of their orbit. Fruit diameters deviating from a mean size, whether it be larger or smaller, would be engaged by the gripping heads of 108 before such fixed point when the diameter is larger than mean diameter and after such point when the diameter is smaller than the mean diameter. It is a feature of this invention to provide a construction which will insure coincidence of the imaginary center of the fruit gripping heads 108 with the center of the peach regardless of the size variation.

As shown in FIGURE 6, the shaft 50 is provided with a short lever 110 having the other push rod 60 pivotally connected thereto. Thus, as the lever 56 rotates the shaft 50 in a counter-clockwise direction (FIG. 6), the push rods 60 move upwardly relative to the carriage frame 16, causing the upward pivotal movement of the pitter mechanism 20 about the pivots 33. Rotation of the shaft 50 in a clockwise direction would cause downward pivotal movement of the pitter mechanism 20 with respect to the carriage conveyor frame 16.

On the end of the lever 110 is fixed a short stub shaft 116 rotatably supporting an idler sprocket 118 which is in mesh with the sprocket chain 46. By virtue of the rigid connection of the arm 110 to the shaft 50, rotation of this shaft also causes displacement of the sprocket 118 upwardly or downwardly depending upon the direction in which the shaft is rotated. Such displacement of the sprocket 118 serves to advance or retard the arrival of each individual carriage with reference to the point at which fruit of medium size is engaged by the fruit gripping heads 108.

A preliminary example will be given to illustrate this point. Let it be assumed that the pitter mechanism 20 has been adjustably raised to locate the orbit of the transfer turret for processing of large diameter fruit. This, of course, would require counterclockwise rotation of the shaft 50 and upward movement of the sprocket 118. Such movement of the sprocket has the effect of momentarily slackening the tension on the reach of the chain 46 which is engaged by the sprocket 118. As the sprocket 44 rotates the slack is taken up first, with the result that rotation of sprocket 80 is momentarily delayed thereby causing a slight indexing of sprocket 80 relative to the sprocket 44. Consequently the carriage conveyor chain 78 is retarded, causing the carriages 22 to establish a fruit pick-up point in advance of the point at which fruit of medium size are picked up. In a similar manner, when fruit of small size is to be processed, the turnbuckle 66 is manipulated to rotate the shaft 50 in a clockwise direction thereby lowering the push rod 60 and the sprocket 118. This obviously imparts an extra pull on the chain 46 and momentarily increases the tension on the chain which results in advancing the carriage sprocket chain 78 and, accordingly, the timing between each individual carriage and the transfer turret 102 is advanced. Thus, for small fruit the carriages are indexed forwardly relative to the gripper heads 108 so that the heads will be closer together when they grip the small fruit than they are when they grip medium size fruit.

Above the transfer turret 102, and fixed on the pitter head mechanism 20, there are a pair of laterally spaced coplanar blades 120 and 122 (FIG. 7) provided with confronting sharpened edges 120a and 122a. As explained in the above reference Elford application, and as shown in the Figure 32 thereof, the transfer turret is effective to impale the fruit on these blades in such a manner that the suture plane is located in the plane of the cutting edges 120a and 122a and they cut substantially to the margin of the pit.

In FIGURES 7 and 8 there is diagrammatically shown the relative change of the point at which the fruit is engaged by the gripping heads 108 when the machine is adjusted for processing small fruit (FIG. 7) and when large fruit is being processed (FIG. 8). The orbit described by the imaginary center of each gripping head 108 is designated by the letter T and the range of adjustment of the center of the shaft 42 by the adjusting mechanism 48 is indicated by construction lines $C_L$ and $C_s$ being respectively the center location for large and small fruit. The point at which fruit of medium size is engaged by the gripping heads 108 is defined by the intersection of a vertical line passing through the center of the shaft 42 and a horizontal line $C_m$ which is the location of the pit centers of each medium fruit. The point defined by the intersection of these lines is indicated by the letters $P_m$. The imaginary center of each of the gripping heads 108 is defined by the intersection of a radial line passing through the center of the shaft 42 and the imaginary circle T. This point is designated by the letters $H_c$.

When a fruit of medium size is being processed by the machine, the centers of the gripping heads $H_c$ is coincident with the point $P_m$. The center location of the shaft 42 is midway between the lines $C_L$ and $C_s$ and is indicated by the line $S_m$. However, since the arms must travel inwardly a greater distance before they engage a fruit of small diameter, it is necessary to advance the position of the carriages with relation to the rotation of the transfer turret 102 so that the center $H_c$ of each gripping head will coincide with the center of a small fruit.

In describing the operation of this invention it will be assumed that the machine had completed processing of medium sized fruit and it is to be adjusted for processing fruit of small diameter. To make this adjustment, the turnbuckle 66 is manipulated to rotate the lever 64 and the shaft connected thereto in a clockwise direction (FIG. 6) lowering the pitter mechanism 20 until the center $S_m$ of the shaft 42 is lowered a sufficient distance to line $C_s$ to locate the center $H_c$ of each gripping head 108 to describe an orbit which is tangent to the pit-center line $C_s$ of small fruit. Concurrently with the lowering of the head 20, the sprocket 118 which is also connected to the shaft 50 is lowered causing a slight indexing movement to the shaft 98, which would be in a clockwise direction as viewed in FIGURE 6, thus advancing the run 78A of chain 78 which transports the carriages 22. When this adjustment has been made, the gripping heads 108 will grasp the small fruit at the point $P_s$ which is slightly in advance of the point $P_m$. As the turret rotates, each pair of arms 104 moves inwardly and grips the small fruit at the point $P_s$ and this point would be coincident with the imaginary center $H_c$ of each gripping head 108. When a fruit is gripped in this manner, it is impaled upon the knives 120 and 122 in such a manner that the pit of each fruit is substantially midway between the cutting edges 120a and 122a. FIGURE 8 shows the relationship of parts when the machine is adjusted to process fruit of large diameter. It should be noted that the fruit engaging point indicated by PL is upstream from the medium fruit gripping point Pm. The adjustment mechanism 48 is actuated displacing the lever 56 in a clockwise direction (FIG. 3) causing the rods 60 to be moved upwardly, pivotally moving the pitter mechanism a corresponding distance upwardly about the pivots 33. The orbit T of the transfer turret is now tangent with the pit-center reference line CL. Rotation of the shaft 50 by the lever 56 displaces the idler sprocket 118 upwardly causing the chain 46 to effect a slight retardation of the run 78A of carriage conveyor chain 78. Large fruit is therefore engaged by the head 108 at the point PL which desirably coincides with the center Hc of each head 108. The result, of course, is that the fruit is impaled between the knives 120 and 122 so that cuts of substantially equal depth are made in the suture plane.

In view of the above disclosure it can be appreciated that this invention provides an exceedingly simple and trouble free method of conditioning a transfer mechanism to handle articles of various sizes while maintaining a certain relation between the transfer device and the article regardless of size variation.

While a preferred embodiment of the invention has been shown and described it is to be understood that various modifications can be made without departing from the spirit of the invention.

Having described the invention what we claim is:

1. An apparatus for timing a fruit processing machine so that fruit of various sizes may be correctly processed, said apparatus comprising a stationary frame having means thereon for supplying oriented fruit to a transfer station, a frame movably mounted on said stationary frame and rotatably supporting a transfer turret which is operable at one point of its orbit to remove the oriented fruit from said supply means and move it to a bisecting and pitting mechanism, means for synchronously operating said supply means and said transfer turret in order to present oriented fruit at such one point to thereby insure removal of the fruit from said supply means, and means for raising or lowering said movably mounted frame and for changing the time relationship between said supply means and said turret when fruit of larger or smaller than average diameter is to be processed.

2. The apparatus according to claim 1 wherein said synchronous means comprises a sprocket chain engaging an idler sprocket which is translatable during raising or lowering of said movably mounted frame to slightly displace said chain to, respectively, advance or retard the point at which said transfer turret engages the fruit.

3. The apparatus according to claim 1 wherein said last mentioned means comprises a rock shaft, means for rotating said rock shaft, and push rods translated in response to the rotation of said rock shaft, said rods being operable to raise and lower said movably mounted frame relative to said stationary frame.

4. The apparatus according to claim 1 further comprising an operating lever and a transverse shaft secured to and intermediate the ends of said lever said shaft being rotatably supported on said stationary frame, a turnbuckle attached to one end of said lever and being arranged to reciprocate said lever and rock said shaft, push rods operated by said lever for moving said movable frame relative to said stationary frame, an idler sprocket mounted on an arm rigidly connected to said shaft and extending radially outwardly therefrom, a sprocket chain in mesh with said idler sprocket for imparting driving torque to said fruit supplying means which includes a conveyor chain, said sprocket being displaced during rocking movement of said rock shaft and is accordingly effective to advance or retard said sprocket chain and thereby respectively advance or retard the conveyor chain of said fruit supply means, said operating lever being rotated to move said push rods thereby raising said movable frame and retarding the conveyor of said fruit supply means when fruit of large diameter is being processed and rotated to move said push rods lowering said movable frame and advancing the conveyor of said fruit supply means when fruit of small diameter is being processed.

5. In a fruit processing machine being arranged to handle fruit of various sizes, a bisecting and pitting mechanism mounted in a first frame, a power train for actuating said mechanisms, a conveyor frame having a conveyor traveling in an orbit located in a horizontal plane and including a plurality of closely adjacent carriages for orienting and transporting fruit to said bisecting and pitting mechanism, the fruit being processed are of the type having a suture which is oriented by said carriages in the direction in which the fruit is being transported and with the center of such fruit being located in a common horizontal plane, a rotary transfer turret including pairs of radially extending circumferentially spaced arms each of which have confronting fruit gripping pads at their ends, said arms being moved toward and away from each other during rotation of said turret with such movement being in timed relation with said conveyor so that said turret is effective to grasp the fruit from each carriage and transport it in an arc to the bisecting and pitting mechanism, means for locating the locus described by the center of said gripping pads to be substantially tangent with the line defined by the fruit centers wherein the location of such line is determined by the size of the fruit being processed, and means for advancing or retarding the carriage conveyor relative to the movement of said arms toward each other to enable a fruit of large diameter to be grasped by said pads sooner than a fruit of small diameter.

6. The processing machine of claim 5 further comprising a power train for orbiting the carriage conveyor, a sprocket chain for transmitting power from the power train of said bisecting and pitting mechanism, and means for conditioning said sprocket chain to adjust the timing between said power trains.

7. The processing machine of claim 6 further comprising means, including said conditioning means, for locating the locus of said pads tangent to the line containing the pit centers.

8. The apparatus according to claim 1 wherein said raising and lowering means comprises a bell-crank actuating push rod which causes movement of said movably mounted frame.

9. The apparatus according to claim 8 further comprising an idler sprocket mounted on a lever fixed to said bell crank, and a chain engaged by said sprocket and being associated with said synchronously operating means, said sprocket being effective to index said sprocket chain in response to the raising or lowering of said movably mounted frame in order to change the time relationship between the rotation of said transfer turret and fruit supplying means.

10. An apparatus according to claim 1 further comprising means for laterally adjusting said transfer turret relative to the path of said supply means.

References Cited by the Examiner
UNITED STATES PATENTS
2,953,236  9/1960  Buchner _____ 198—33.1

EVON C. BLUNK, *Primary Examiner.*

R. E. AEGERTER, *Assistant Examiner.*